United States Patent
Wang et al.

(10) Patent No.: US 6,394,611 B1
(45) Date of Patent: May 28, 2002

(54) SOLID ROD DUST-PROOF STRUCTURE FOR PROJECTING APPARATUSES

(75) Inventors: Ken Wang; Dylan Liu, both of Hsinchu (TW)

(73) Assignee: Coretronic Corporation, Science-Based Industrial Park ( * ) Notice: Subject to any disclaimer, the term of this patent is extended or adjusted under 35 U.S.C. 154(b) by 15 days.

(21) Appl. No.: 09/634,028

(22) Filed: Aug. 8, 2000

(30) Foreign Application Priority Data

Mar. 17, 2000 (TW) ........................ 89204447 U

(51) Int. Cl.[7] ................ G03B 21/14; G03B 21/28; G03B 21/00; G03B 6/00; G03B 6/10
(52) U.S. Cl. .................. 353/119; 353/99; 353/122; 385/133; 385/146; 385/147
(58) Field of Search ................ 353/98, 99, 119, 353/122; 385/133, 901, 147, 88, 146

(56) References Cited

U.S. PATENT DOCUMENTS

| | | | |
|---|---|---|---|
| 4,456,329 A | * | 6/1984 | Henderson, et al. ......... 385/44 |
| 5,530,940 A | * | 6/1996 | Ludwig, Jr. et al. ......... 385/31 |
| 5,625,738 A | * | 4/1997 | Magarill ..................... 385/146 |

* cited by examiner

*Primary Examiner*—William Dowling
*Assistant Examiner*—Magda Cruz
(74) *Attorney, Agent, or Firm*—Winston Hsu

(57) ABSTRACT

The invention discloses a solid rod dust-proof structure for projecting apparatuses. The solid rod includes an incident-beam surface and an outgoing-beam surface. The dust-proof structure includes: a housing provided with a first chamber and a second chamber connecting each other wherein the cross section of the second chamber is greater than that of the first chamber. The first chamber contains the solid rod, and a stopping portion is installed on the opposite end of the second chamber for stopping the solid rod; and a dust-proof plate being a transparent plate is contained in the second chamber to completely cover the outgoing-beam surface of the solid rod. Using the above structure, the outgoing-beam surface of the solid rod can be completely covered by the transparent dust-proof plate so that the structure is free from dust and the light transmitting through the outgoing-beam surface will not be blocked.

5 Claims, 7 Drawing Sheets

SOLID ROD DUST-PROOF STRUCTURE FOR PROJECTING APPARATUSES

BACKGROUND OF THE INVENTION

1. Field of Invention

The present invention relates to a projecting apparatus and, in particular, to a solid rod dust-proof structure for projecting apparatuses.

2. Related Art

Shown in FIG. 1 is a schematic view of an optical system of a projecting apparatus. The apparatus includes a reflection mirror 10, a light source 11, a first lens set 12, a solid rod 13, a second lens set 14, a projecting display apparatus 15, an image formation device 16 and a display screen 17. The first lens set 12 consists of at least a lens. The solid rod 13 being an optical device that can homogenize the light passing through includes an incident-beam surface 131 and an outgoing-beam surface 132. The second lens set 14 consists of at least one lens or optical device. The projecting display apparatus 15 can be a transmissive LCD, a reflective LCD, a digital micro device (hereinafter as DMD) or other display devices.

The projecting display apparatus 15 in FIG. 1 is a transmissive LCD and the image formation device 16 is a projecting device. Through the solid rod 13, light can be converged onto the incident-beam surface 131 of the solid rod 13 by directly transmitting from the light source 11 or by reflecting from the reflection mirror 10 and through the first lens set 12. The light that is homogenized after passing through the solid rod 13 reaches the projecting display apparatus 15 through the second lens set 14. Therefore, the image on the projecting display apparatus is projected onto the display screen 17 by the image formation device 16.

The projecting display apparatus 15 in FIG. 2 is a DMD. The light, transmitting to the DMD 15 and being reflected from the DMD 15 to the image formation device 16, projects the image formed on the DMD 15 toward the display screen 17. image formed on the DMD 15 toward the display screen 17.

The projecting display apparatus 15 in FIG. 3 is a reflective LCD. When light enters the second lens set 14, it first transmits to the projecting display device 15, reflects back on the second lens set 14. Afterward, the light, turning a 90-degree angle and transmitting to the image formation device 16 projects the image formed on the reflective LCD 15 toward the display screen 17.

The main function of the solid rod 13 is to homogenize the light passing through so as to achieve the effect of making the projected image uniform. However, one problem is that: when there is dust on the outgoing-beam surface 132 of the solid rod, the dust will also be projected onto the display screen 17 and to blur the image.

Currently, only the dust on the outgoing-beam surface 132 of the solid rod 13 will be projected onto the display screen 17 while the dust on the other portion will not. Thus, this problem can be solved once a dust-proof structure is provided for the outgoing-beam surface 13.

SUMMARY OF THE INVENTION

It is one of the object of the invention to provide a solid rod dust-proof structure for projecting apparatuses that can prevent the outgoing-beam surface of the solid rod from dust accumulation so that the transmitting light through the outgoing plane will not be blocked. This structure can thus avoid the influence of the dust on the projected image.

To achieve the above object, the solid rod in the structure has an incident-beam surface and an outgoing-beam surface. The dust-proof structure includes a housing having a first chamber and a second chamber wherein the cross section of the second chamber is greater than that of the first chamber. The first chamber contains the solid rod, and the opposite end of the second chamber includes a stopping portion for stopping the solid rod. Also, a dust proof plate which is a transparent plate is contained in the second chamber of the housing for completely covering the outgoing-beam surface of the solid rod.

Using the above structure, the outgoing-beam surface of the solid rod can be completely covered by the transparent dust-proof plate so that the structure is free from dust and the light transmitting through the outgoing-beam surface will not be blocked.

BRIEF DESCRIPTION OF THE DRAWINGS

The foregoing and other objectives, characteristics, and advantages of the present invention can be more fully understood by reading the following detailed description of the embodiments with reference to the accompanying drawings as follows.

DETAILED DESCRIPTION OF THE INVENTION

Figure 1:
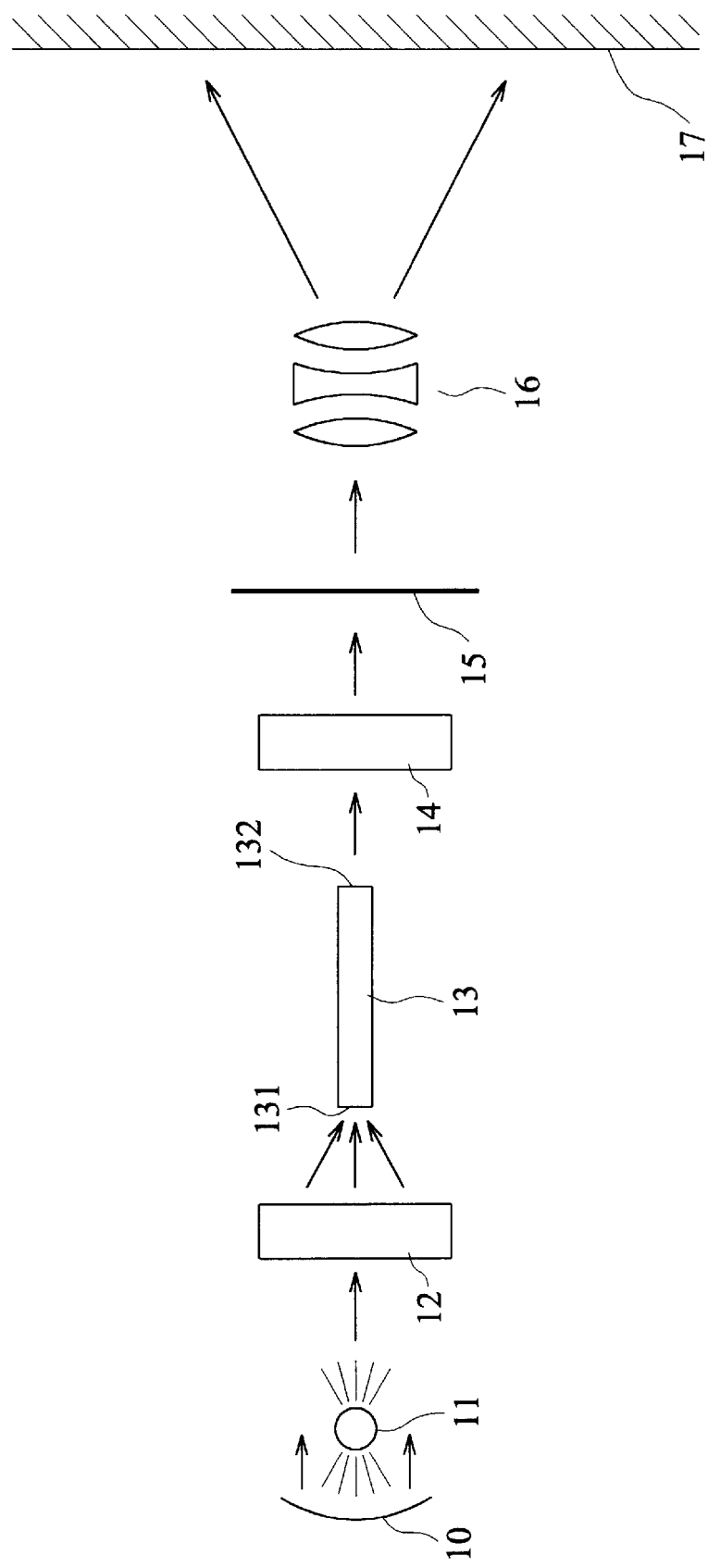
FIG. 1 is a schematic view of an optical system for a transmissive LCD projecting apparatus in the prior art.
Figure 2:
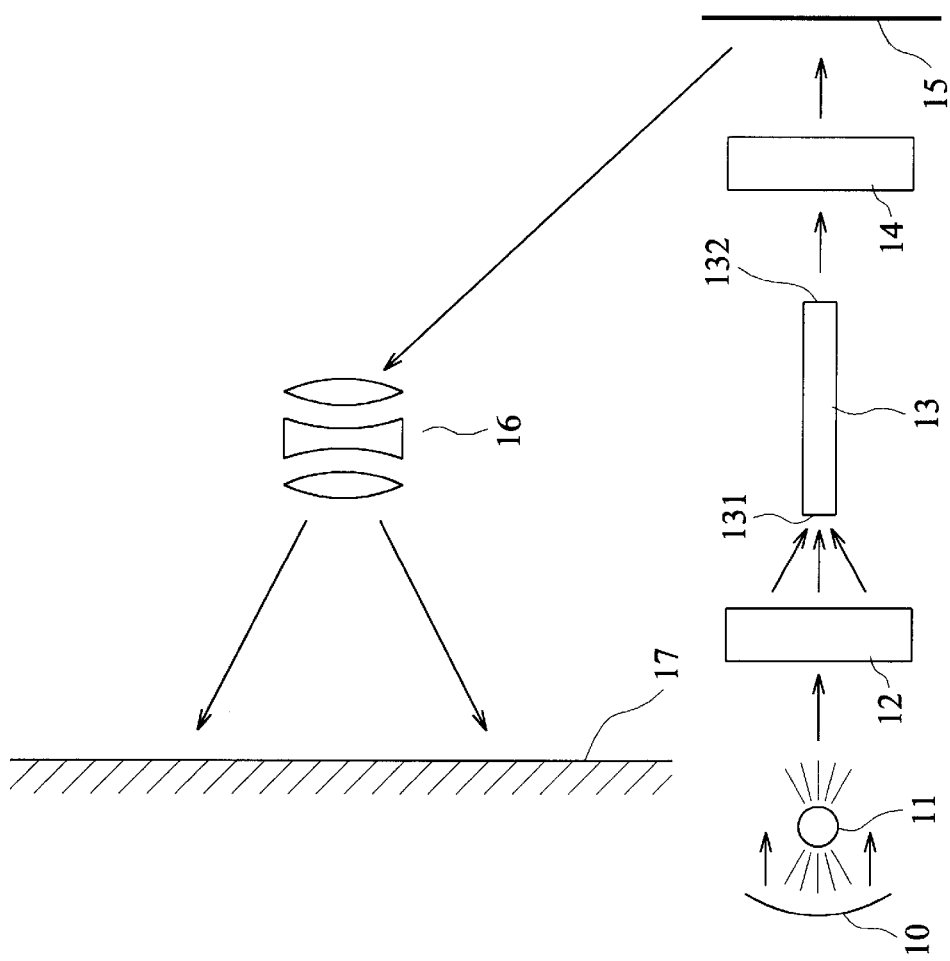
FIG. 2 is a schematic view of an optical system for a DMD projecting apparatus in the prior art.
Figure 3:
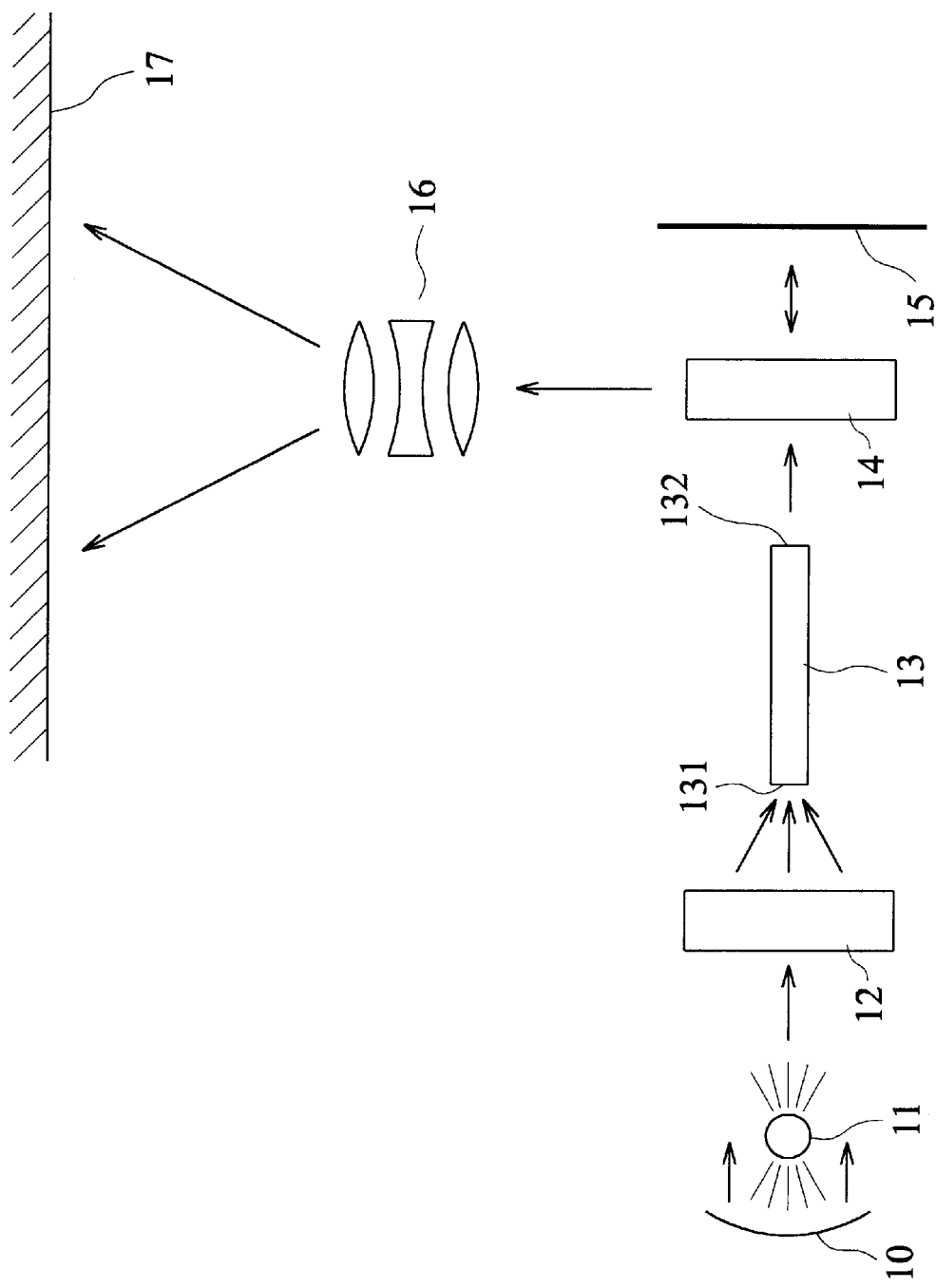
FIG. 3 is a schematic view of an optical system for a reflective LCD projecting apparatus in the prior art.
Figure 4:
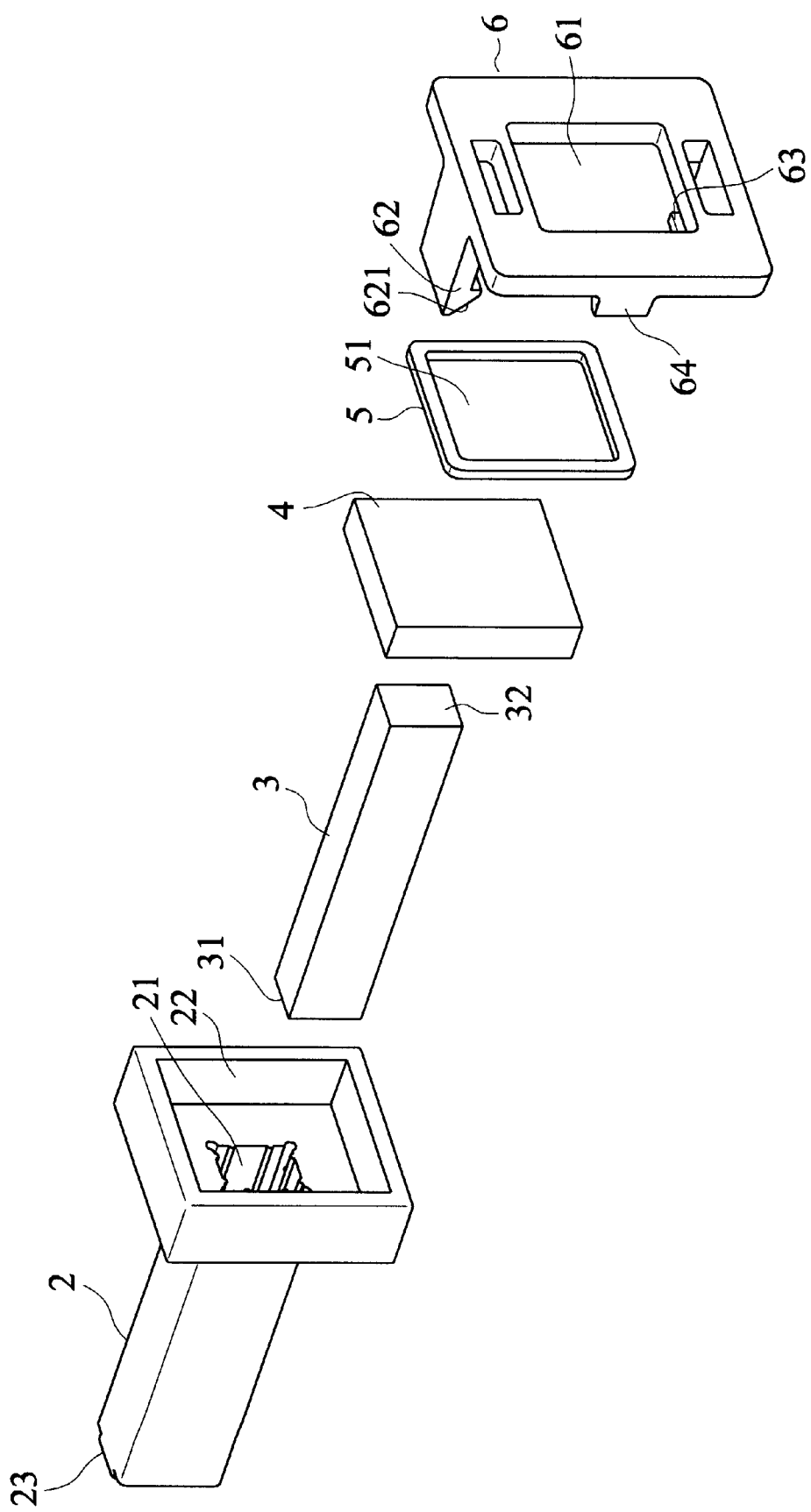
FIG. 4 is a three dimensional exploded diagram of a first embodiment of the invention.
Figure 5:
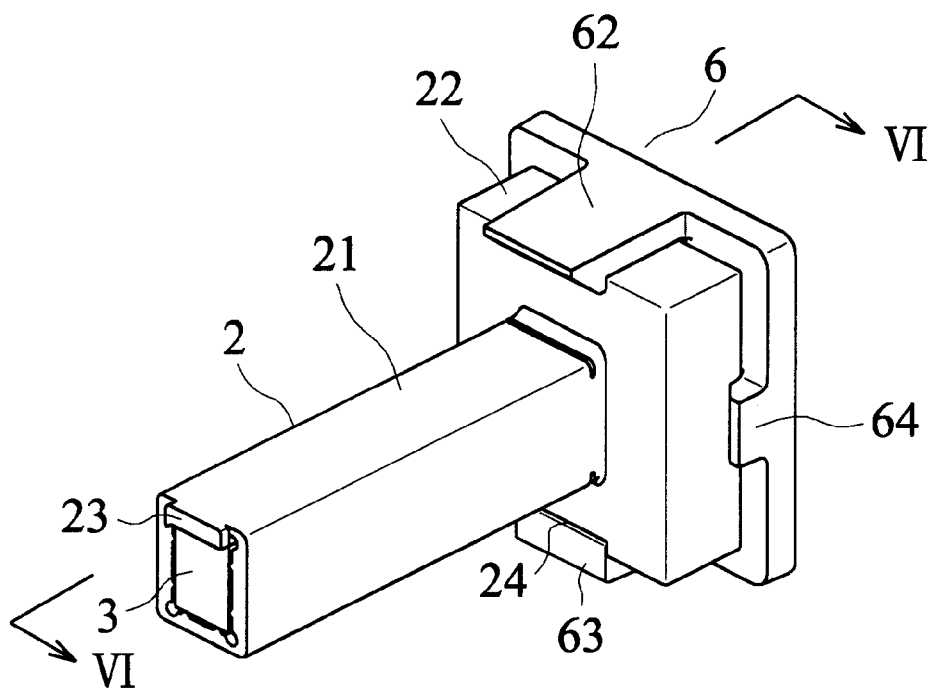
FIG. 5 is a three-dimensional combination diagram of a first embodiment of the invention.
Figure 6:
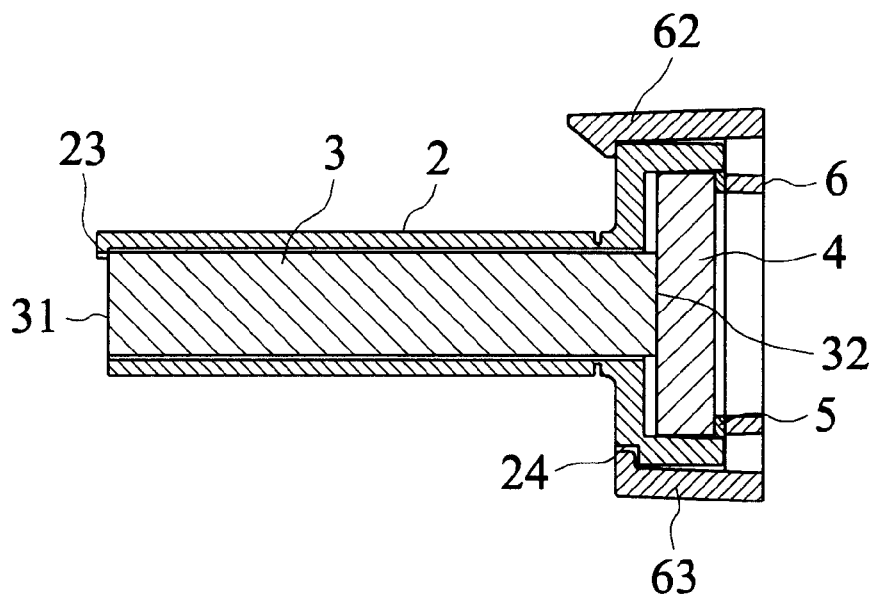
FIG. 6 is a cross-sectional combination diagram of a first embodiment of the invention.

Please refer to FIGS. 4, 5 and 6 for a first embodiment of the invention. In the drawings, the solid rod 3 has an incident-beam surface 31 and an outgoing-beam surface 32. The dust-proof structure includes: a housing 2, a dust-proof plate 4, a buffering pad 5 and a fastening cover 6.

The housing 2 is provided with a first chamber 21 and a second chamber 22 in connecting with each other wherein the cross section of the second chamber 22 is greater than that of the first chamber 21 and its back has a recess 24 (FIGS. 5 and 6). The first chamber contains the solid rod 3 and the opposite end of the second chamber 22 has a stopping portion 23 for stopping the solid rod.

The dust-proof plate 4 is a transparent plate, such as a glass plate or an acryl plate, positioned in the second chamber 22 of the housing 2 to press against and completely cover the outgoing-beam surface of the solid rod 3. The buffering pad 5 having a window 51 for covering the dust-proof plate 4 is made of rubber.

The central portion of the fastening cover 6 has also a window 61. Two of its sidewalls are symmetrically provided with hooks 62, 63 and the other two sidewalls are symmetrically provided with two stopping portions 64. The front end of the hook 62 is provided with a slant guiding surface 621. The fastening cover 6 first covers the exterior of the buffering pad 5 and the dust-proof plate 4. Then the hook 63 holds on the recess 24 on the back of the second chamber 22 of the housing 2 while the hook 62 holds on the back of the second chamber 22 using its guiding surface 621. In this way, the dust-proof plate 4 and the buffering pad 5 are fixed to the second chamber 22.

Using the above structure, the outgoing-beam surface 32 of the solid rod 3 can be completely covered by the dust-proof plate 4. No dust is accumulated on the outgoing-beam surface 32, thereby, no dust-image is projected onto the display screen. Since the outgoing-beam beam surface 32 of the solid rod 3 presses against the dust-proof plate 4, the incident-beam surface 31 presses against the stopping portion 23, and the fastening cover 6 covers the rim of the dust-proof plate 4, the outgoing-beam surface 32 of the solid rod 3 is completely free from blocking, thereby, the light can transmit through without any interference.

Figure 7:
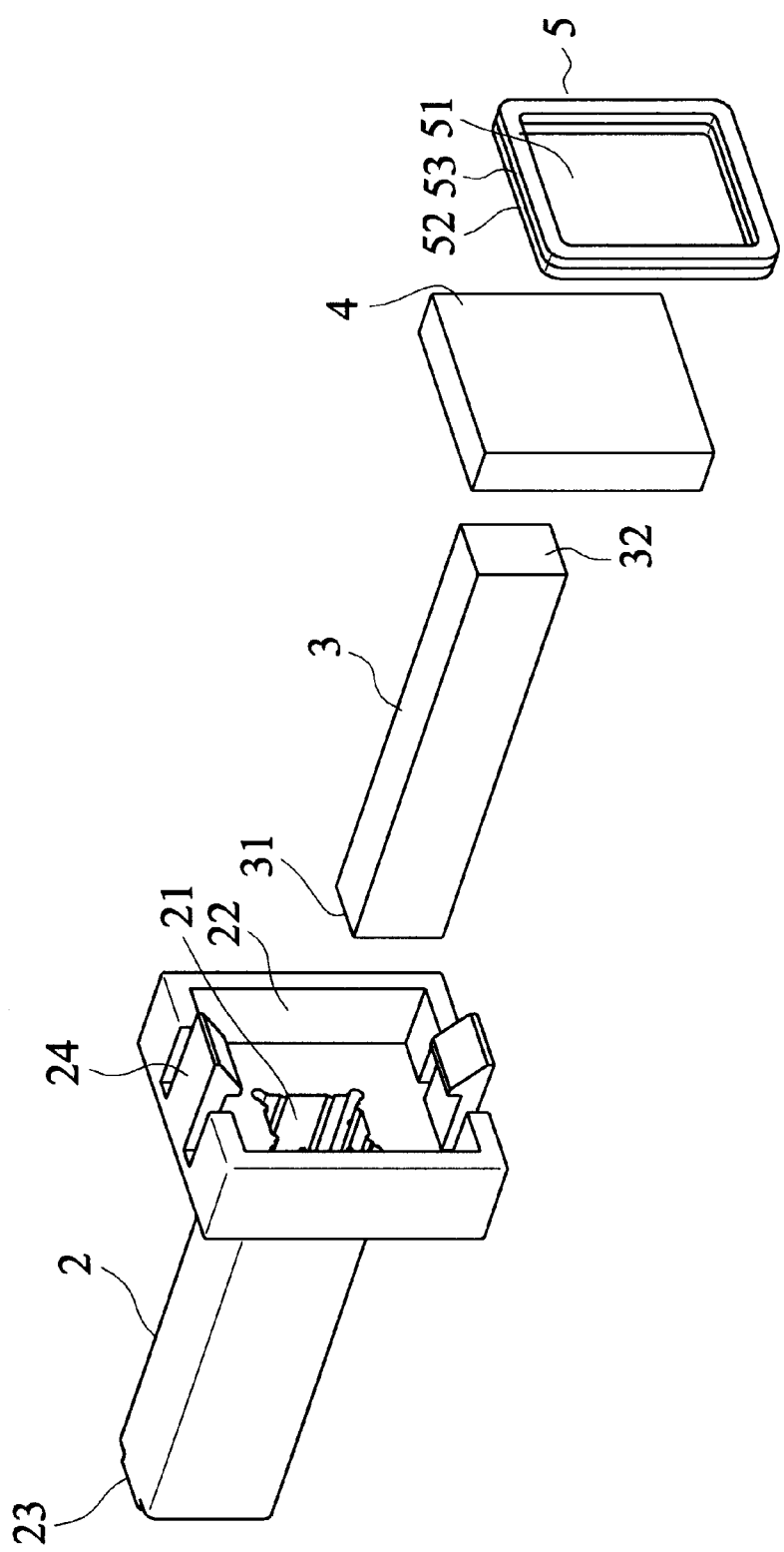
FIG. 7 is a three dimensional exploded diagram of a second embodiment of the invention.
Figure 8:
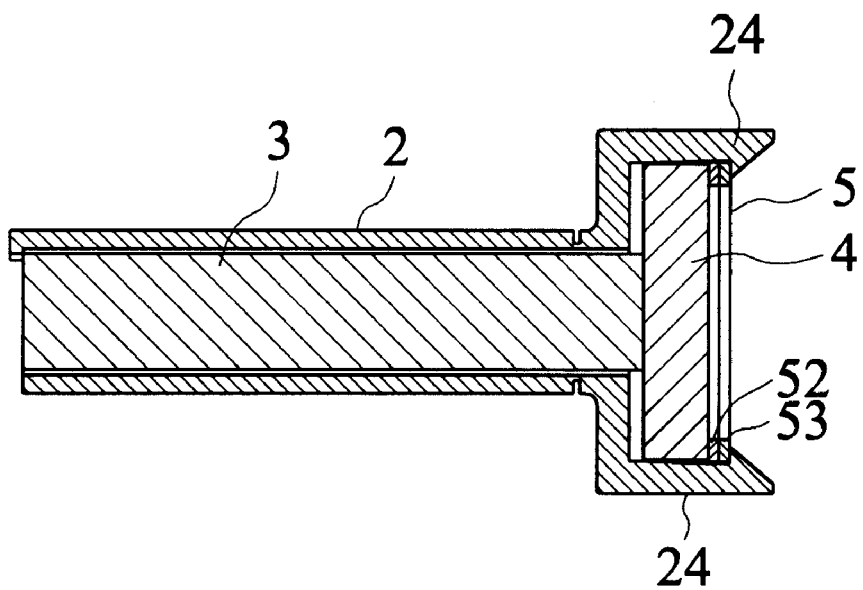
FIG. 8 is a cross-sectional combination diagram of a second embodiment of the invention.

FIGS. 7 and 8 show a second embodiment of the invention. The second embodiment is different from the previous one in that two hooks 25 are symmetrically installed at the end of the second chamber 22 of the housing 2. The hook 25 is provided with a slant guiding surface 251. When the dust-proof plate 4 and the buffering pad 5 are inserted into the second chamber 22, it can hold on the rim of the dust-proof plate 4 and the buffering pad 5. The buffering pad 5 in the current embodiment is provided with a rubber inner cushion 52 and a plastic outer shell 53. The fastening cover 6 used in the first embodiment is not needed in this case.

Figure 9:
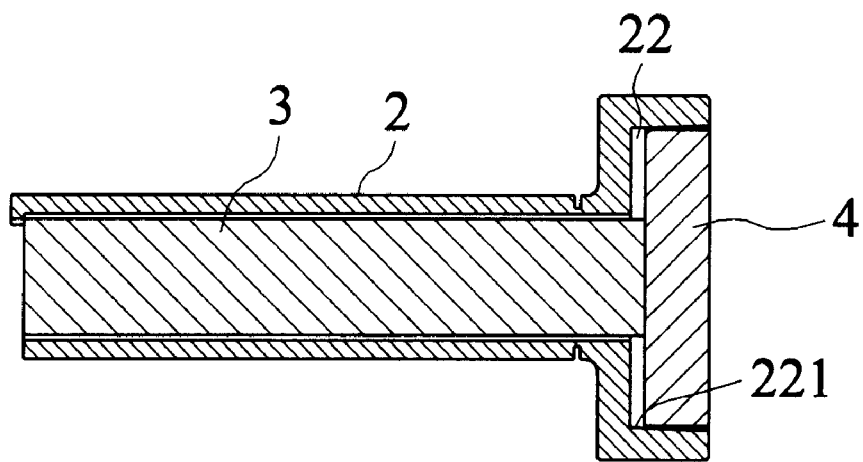
FIG. 9 is a cross-sectional combination diagram of a third embodiment of the invention.

FIG. 9 shows the third embodiment of the invention. It is different from the first embodiment in that the edge surfaces of the dust-proof plate 4 are glued to fix onto the sidewalls 221 of the second chamber 22.

The invention has been described using exemplary embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A solid rod dust-proof structure for projecting apparatuses, wherein the solid rod has an incident-beam surface and an outgoing-beam surface, comprising:

a housing provided with a first chamber and a second chamber connecting to each other, wherein the cross section of the second chamber is greater than the first chamber, and the first chamber contains the solid rod, and the end that is opposite to the second chamber has a stopping portion for stopping the solid rod; and a dust-proof plate, being a transparent plate, contained in the second chamber of the housing for completely covering the outgoing-beam surface of the solid rod.

2. The solid rod dust-proof structure of claim 1 further comprising a fastening cover having a window in the center, and having a plurality of hooks at the rim for holding on the housing in order to cover the dust-proof plate and to fix to the second chamber.

3. The solid rod dust-proof structure of claim 2 wherein the dust-proof plate is first covered by a buffering pad having a window at the central portion, and is then covered by the fastening cover.

4. The solid rod dust-proof structure of claim 1 wherein the end of the second chamber of the housing is symmetrically provided with a plurality of hooks so that the dust-proof plate can be held on when it is installed in the second chamber.

5. The solid rod dust-proof structure of claim 1 wherein the edge surfaces of the dust-proof plate is glued and fixed onto the sidewalls of the second chamber.

* * * * *